(12) United States Patent
Choi et al.

(10) Patent No.: US 10,576,422 B2
(45) Date of Patent: Mar. 3, 2020

(54) REVERSE OSMOSIS FILTER MODULE

(71) Applicant: LG CHEM, LTD., Seoul (KR)

(72) Inventors: Junwon Choi, Daejeon (KR); Ye Hoon Im, Daejeon (KR); Hyoung Joon Son, Daejeon (KR); Young Myung Gee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 104 days.

(21) Appl. No.: 15/745,975

(22) PCT Filed: Jul. 26, 2016

(86) PCT No.: PCT/KR2016/008164
§ 371 (c)(1),
(2) Date: Jan. 18, 2018

(87) PCT Pub. No.: WO2017/057833
PCT Pub. Date: Apr. 6, 2017

(65) Prior Publication Data
US 2018/0207586 A1    Jul. 26, 2018

(30) Foreign Application Priority Data
Sep. 30, 2015 (KR) .................. 10-2015-0137812

(51) Int. Cl.
*B01D 61/10*    (2006.01)
*B01D 65/08*    (2006.01)
(Continued)

(52) U.S. Cl.
CPC ............. *B01D 61/10* (2013.01); *B01D 63/10* (2013.01); *B01D 63/103* (2013.01); *B01D 65/08* (2013.01);
(Continued)

(58) Field of Classification Search
CPC ...... B01D 61/10; B01D 63/103; B01D 65/08; B01D 61/025; B01D 2313/143;
(Continued)

(56) References Cited

U.S. PATENT DOCUMENTS 6,881,336 B2    4/2005  Johnson
9,597,640 B2    3/2017  Koiwa et al.
(Continued)

FOREIGN PATENT DOCUMENTS

JP    H11-179352      7/1999
JP    2005-305422    11/2005
(Continued)

OTHER PUBLICATIONS

Vrouwenvelder et al., "Biofouling in spiral wound membrane systems: Three-dimensional CFD model based evaluation of experimental data," Journal of Membrane Science 346: 71-85 (2010).
Guillen et al., "Modeling the impacts of feed spacer geometry on reverse osmosis and nanofiltration processes," Chemical Engineering Journal 149: 221-231 (2009).

*Primary Examiner* — Lucas A Stelling
*Assistant Examiner* — Angel Olivera
(74) *Attorney, Agent, or Firm* — Dentons US LLP

(57) ABSTRACT

The present invention relates to a reverse osmosis filter module including an improved feed spacer, and particularly, to a reverse osmosis filter module including an improved feed spacer which has an asymmetric diameter in an intersection in which a first set of filaments and a second set of filaments intersect, thereby reducing differential pressure by increasing a cross-sectional area of a flow path, and mitigating concentration polarization by developing a swirl flow.

3 Claims, 4 Drawing Sheets

(51) Int. Cl.
  *B01D 63/10* (2006.01)
  *B01D 61/02* (2006.01)
  *C02F 1/44* (2006.01)

(52) U.S. Cl.
  CPC ...... *B01D 61/025* (2013.01); *B01D 2313/143* (2013.01); *C02F 1/441* (2013.01); *Y10T 428/24058* (2015.01); *Y10T 428/24132* (2015.01)

(58) Field of Classification Search
  CPC ......... B01D 53/22; B01D 61/00–71/82; C02F 1/441; C02F 1/44; Y10T 428/24058; Y10T 428/24132
  See application file for complete search history.

(56) References Cited

U.S. PATENT DOCUMENTS

| | | |
|---|---|---|
| 2003/0205520 A1 | 11/2003 | Johnson |
| 2012/0328844 A1 | 12/2012 | Zounek et al. |
| 2015/0157980 A1 | 6/2015 | Mochizuki et al. |

FOREIGN PATENT DOCUMENTS

| | | |
|---|---|---|
| JP | 2006-507919 | 3/2006 |
| JP | 2009-50759 | 3/2009 |
| JP | 2014-69144 | 4/2014 |
| KR | 10-0976074 | 8/2010 |
| KR | 10-2014-0107214 | 9/2014 |
| WO | 2013085755 | 6/2013 |

[Figure 1]
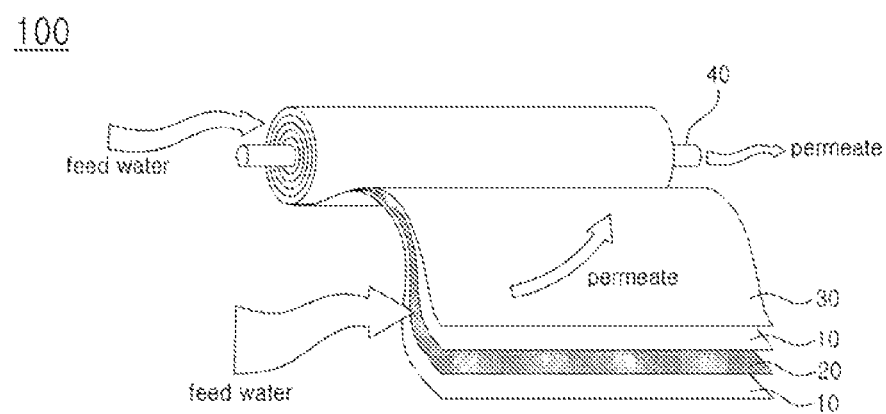

[Figure 2]  << PRIOR ART >>
(a)
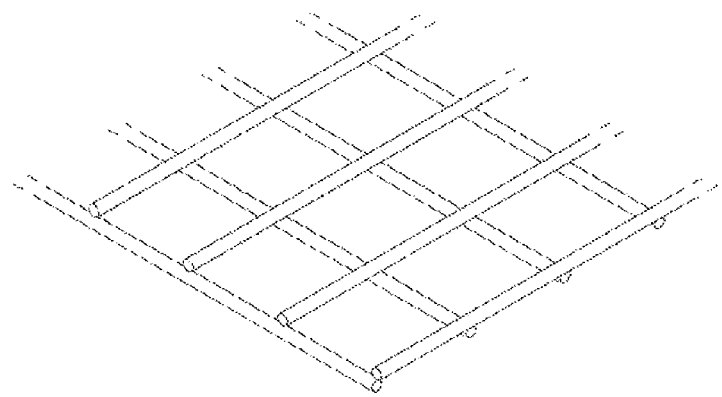
(b)
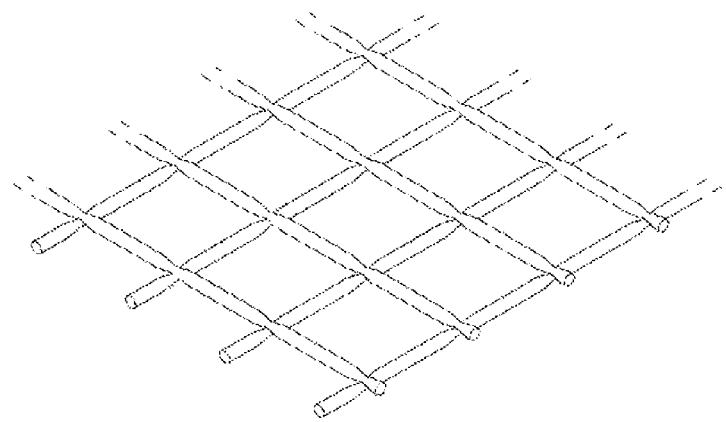
(c)
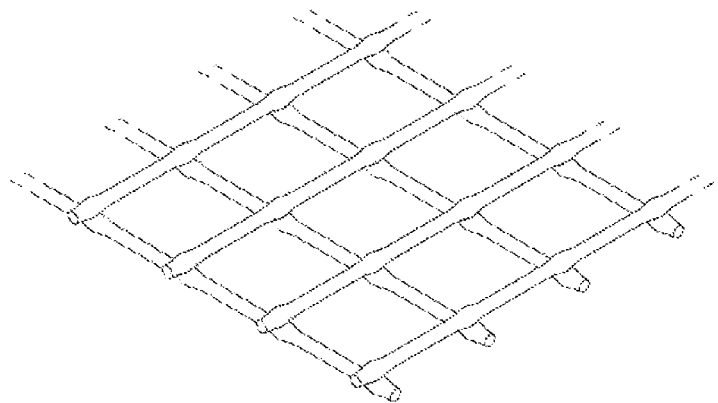

[Figure 3]
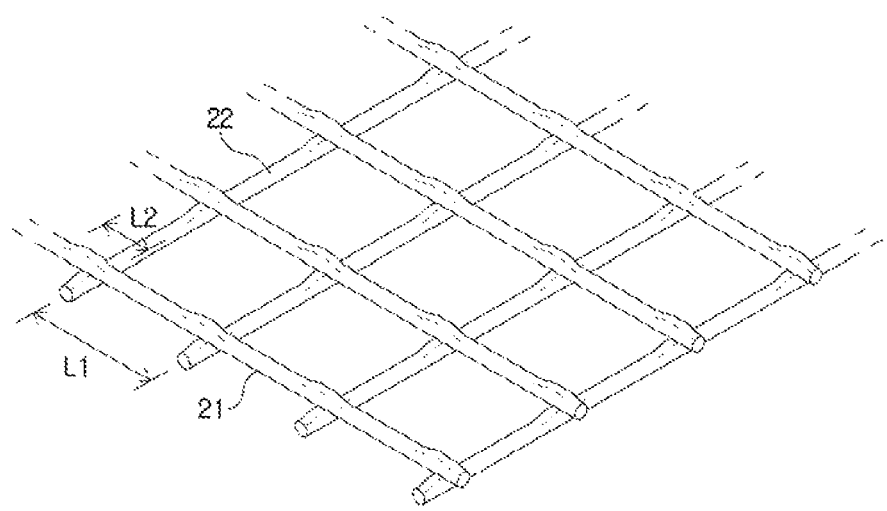

[Figure 4]
(a)
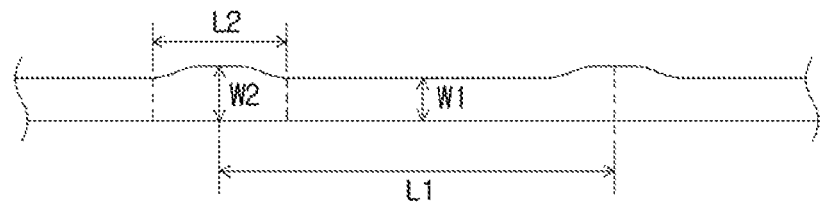
(b)
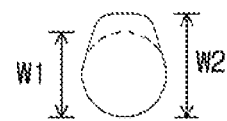

REVERSE OSMOSIS FILTER MODULE

This application is a National Stage Application of International Application No. PCT/KR2016/008164 filed on Jul. 26, 2016, which claims priority to and the benefit of Korean Patent Application No. 10-2015-0137812 filed on Sep. 30, 2015, and Korean Patent Application No. 10-2016-0094188 filed on Jul. 25, 2016 in the Korean Intellectual Property Office, all of which are incorporated herein in their entirety by reference for all purposes as if fully set forth herein.

TECHNICAL FIELD

The present specification claims the benefit of priority to Korean Patent Application No. 10-2015-0137812 filed on Sep. 30, 2015 with the Korean Intellectual Property Office and Korean Patent Application No. 10-2016-0094188 filed on Jul. 25, 2016 with the Korean Intellectual Property Office, the entire contents of which are incorporated herein as a part of the present specification by reference.

The present invention relates to a reverse osmosis filter module including an improved feed spacer, and particularly, to a reverse osmosis filter module including an improved feed spacer which has an asymmetric diameter in an intersection in which a first set of filaments and a second set of filaments intersect, thereby reducing differential pressure by increasing a cross-sectional area of a flow path, and mitigating concentration polarization by developing a swirl flow.

BACKGROUND ART

The lack of water caused by global warming is getting worse globally, and thus water purification technologies for ensuring alternative water resources have attracted attention.

Therefore, a water treatment process, which uses a reverse osmosis membrane which is a key technology for next-generation waterworks that utilize alternative water resources such as seawater desalination, water recycling, and the like, is expected to dominate industrial water markets.

Reverse osmosis membrane permeable water made by the reverse osmosis membrane becomes pure water or water very close to pure water, and used in various field such as fields related to medical sterile water, purified water for artificial dialysis, or water for manufacturing semiconductors in an electronic field.

Here, the reverse osmosis refers to a phenomenon in which a predetermined difference in water level occurs while a solution with low concentration is moved to a solution with high concentration when a predetermined period of time has passed after the two solutions having a difference in concentration are separated by a semipermeable membrane. In addition, a difference in water level occurring during this process refers to reverse osmotic pressure. An apparatus, which purifies water by allowing only water molecules to pass through the semipermeable membrane by using this principle, is referred to as a reverse osmosis facility, and the semipermeable membrane used for the reverse osmosis facility is a reverse osmosis filter module.

The reverse osmosis filter module includes a central tube, a feed spacer, a reverse osmosis (RO) membrane, and a tricot permeate water channel.

Among the components, the feed spacer serves as a passageway through which raw water is introduced. Differential pressure occurs as a flow of raw water is hindered by the feed spacer when the raw water is introduced through the feed spacer, which results in an increase in energy costs, and as a result, the lower the differential pressure, the greater the efficiency of the reverse osmosis filter module.

Meanwhile, a concentration polarization phenomenon inevitably occurs in the vicinity of the reverse osmosis membrane due to a water permeation flux, and as the concentration polarization phenomenon becomes worse, the osmotic pressure is increased in the vicinity of the reverse osmosis membrane, such that water permeability deteriorates.

In this regard, there is a need for a feed spacer capable of increasing efficiency of the reverse osmosis filter module by reducing the occurrence of differential pressure and mitigating the concentration polarization phenomenon.

DETAILED DESCRIPTION OF THE INVENTION

Technical Problem

An object of the present invention is to provide a reverse osmosis filter module including an improved feed spacer which has an asymmetric diameter in an intersection in which a first set of filaments and a second set of filaments intersect, thereby reducing differential pressure by increasing a cross-sectional area of a flow path, and mitigating concentration polarization by developing a swirl flow.

Technical Solution

A reverse osmosis filter module according to the present invention includes: a tube which includes an opening that accommodates a permeable liquid in a longitudinal direction; one or more reverse osmosis membranes which extends outward from the tube and are wound around the tube; and a feed spacer which is in contact with the one or more reverse osmosis membranes and wound around the tube, in which the feed spacer is configured such that a first set of parallel filaments and a second set of parallel filaments intersect, and one or more of the first set of filaments or one or more of the second set of filaments have an asymmetric diameter formed as partial regions of outer surfaces of the filaments protrude outward in an intersection in which the first set of filaments and the second set of filaments intersect.

In particular, the intersection may have a ratio of 0.2 to 0.4 with respect to a lattice length of the feed spacer.

In particular, a thinning parameter in the intersection may be 1.2 or more, more particularly, 1.3 or more.

In particular, the asymmetric diameter may be made such that one side of the filament protrudes outward with respect to a flow direction of raw water and the other side of the filament is maintained as it is.

Advantageous Effects

According to the present invention, the reverse osmosis filter module is designed to have an asymmetric diameter in the intersection in which the first set of filaments and the second set of filaments intersect, and as a result, it is possible to reduce differential pressure by increasing a cross-sectional area of a flow path, and to mitigate concentration polarization by developing a swirl flow.

In addition, with the aforementioned effect, it is possible to further increase efficiency of the reverse osmosis filter module.

BRIEF DESCRIPTION OF DRAWINGS

FIG. 1 is a perspective view of a reverse osmosis filter module 100 for a water treatment according to an exemplary embodiment of the present invention.

FIGS. 2A, 2B, and 2C are schematic views of feed spacers in the related art which are used for a reverse osmosis filter module.

FIG. 3 is a perspective view of a feed spacer used for the reverse osmosis filter module 100 for a water treatment according to the exemplary embodiment of the present invention.

FIGS. 4A and 4B are a front view and a cross-sectional side view of the feed spacer used for the reverse osmosis filter module 100 for a water treatment according to the exemplary embodiment of the present invention.

BEST MODE

Hereinafter, an exemplary embodiment of a reverse osmosis filter module according to the present invention will be described with reference to the accompanying drawings. Here, thicknesses of lines illustrated in the drawings, sizes of constituent elements, or the like may be exaggerated for clarity and convenience of description. In addition, the terms used in the following description are defined considering the functions in the present invention and may vary depending on the intention or usual practice of a user or an operator. Therefore, the definition of the terms should be made based on the entire contents of the present specification.

<Reverse Osmosis Filter Module>

FIG. 1 is a perspective view of a reverse osmosis filter module 100 for a water treatment according to an exemplary embodiment of the present invention, FIGS. 2A, 2B, and 2C are schematic views of feed spacers in the related art which are used for a reverse osmosis filter module, FIG. 3 is a perspective view of a feed spacer used for the reverse osmosis filter module 100 for a water treatment according to the exemplary embodiment of the present invention, and FIGS. 4A and 4B are a front view and a cross-sectional side view of the feed spacer used for the reverse osmosis filter module 100 for a water treatment according to the exemplary embodiment of the present invention.

Hereinafter, the reverse osmosis filter module 100 for a water treatment according to the exemplary embodiment of the present invention will be specifically described with reference to FIGS. 1 to 4.

The reverse osmosis membrane module 100 is a constituent element of a membrane separation device that serves to purify actually supplied water by using the reverse osmosis principle.

Referring to FIG. 1, the reverse osmosis membrane module 100 may include a reverse osmosis membrane 10, a feed spacer 20, a tricot permeate water channel 30, and a tube 40 having an opening (not illustrated) for accommodating a permeable liquid in a longitudinal direction. Although not illustrated, the reverse osmosis membrane module 100 may further include a pair of anti-telescoping devices, but a specific description thereof will be omitted.

The one or more reverse osmosis membranes 10 serve to filter the water to remove foreign substances contained in the water by using the osmosis, and also serve as flow paths through which purified water effectively flows.

The one or more reverse osmosis membranes 10 extend outward from the tube 40 and are wound around the tube 40.

The feed spacer 20 forms a passageway through which raw water is introduced from the outside, and serves to maintain an interval between one reverse osmosis membrane 10 and the other reverse osmosis membrane 10. To this end, upper and lower sides of the feed spacer 20 are in contact with the one or more reverse osmosis membranes 10, and the feed spacer 20 is configured to be wound around the tube 40, similar to the one or more reverse osmosis membranes 10.

Here, a material of the feed spacer 20 is not particularly limited, but the feed spacer 20 may be made of any one of polyethylene, polyvinyl chloride, polyester, and polypropylene.

Meanwhile, a specific configuration of the feed spacer 20 will be described below.

The tricot permeate water channel 30 has a general fabric structure, and serves as a flow path forming a space through which the water purified by the reverse osmosis membrane 10 may flow to the outside.

In this case, it is noted that the tricot permeate water channel 30 is configured to have strength sufficient to withstand hydraulic pressure because fabric tissue lines of the tricot permeate water channel 30 need to move an appropriate amount of water while preventing the water from being blocked between the lines and while withstanding hydraulic pressure occurring when the reverse osmosis membrane module 100 operates.

The tube 40 is positioned at a center of the reverse osmosis filter module 100 for a water treatment, and serves to a passageway through which the filtered water is introduced and discharged.

To this end, an air gap or opening having a predetermined size may be formed outside the tube 40 so that the filtered water may be introduced. In this case, one or more air gaps may be formed so that the filtered water may be more efficiently introduced.

Meanwhile, the feed spacer 20 according to the exemplary embodiment of the present invention is configured such that a first set 21 of parallel filaments and a second set 22 of parallel filaments intersect, and in this case, one or more of the first set 21 of filaments and/or one or more of the second set 22 of filaments may have an asymmetric diameter in the vicinity of an intersection part in the vicinity of an endpoint where the first set 21 of filaments and the second set 22 of filaments intersect.

Referring to feed spacers 20a, 20b, and 20c in the related art, it can be seen that the diameters of the filaments are not changed but maintained as it is at the points where the two sets of parallel filaments intersect (see FIG. 2A), the diameters of the filaments are decreased at the points where the two sets of parallel filaments intersect (see FIG. 2B), or the diameters of the filaments are increased at the points where the two sets of parallel filaments intersect (see FIG. 2C). In addition, it can be seen that the diameters of the filaments are symmetrically increased or decreased based on the cross sections of the filaments.

However, the feed spacer 20 according to the present invention is configured such that only outer portions of the first set 21 of filaments and/or the second set 22 of filaments protrude outward in the intersection, and more specifically, only the outer portion of the filament partially protrudes outward, but a portion of the filament, which is opposite to the protruding portion, is maintained as it is, and as a result, it is possible to implement an asymmetric cross-sectional shape of the filaments while increasing the cross-sectional area of the flow path (see FIGS. 4A and 4B).

In this case, an intersection L2 may have a ratio of 0.2 to 0.4 with respect to a lattice length L1 of the feed spacer 20. The reason is that it is difficult to generate a sufficient swirl flow if the ratio is less than 0.2, and the cross-sectional area is decreased such that differential pressure is increased if the ratio is more than 0.4.

In addition, a thinning parameter of the first set 21 of filaments and/or the second set 22 of filaments in the intersection L2 may be 1.2 or more, particularly, 1.3 or more.

The reason is that when the thinning parameter is as large as possible in a state in which a size of a thick portion is fixed, the cross-sectional area of the flow path is increased, such that the differential pressure is reduced, and a degree to which the swirl flow is generated is not greatly affected.

Here, it is noted that the thinning parameter means a thickness ratio of an asymmetric portion W2 in the intersection L2 to a thin portion W1 based on the thicknesses of the first set 21 of filaments and/or the second set 22 of filaments.

Meanwhile, the drawings illustrate that both of the first set 21 of filaments and the second set 22 of filaments have the asymmetric diameter, but it is noted that only one or more of the cross sections of the first set 21 of filaments and the second set 22 of filaments may have the asymmetric diameter.

With this configuration, the feed spacer 20 according to the present invention is designed such that one or more of the first set 21 of filaments and the second set 22 of filaments have the asymmetric diameter in the intersection L2 in which the first set 21 of filaments and the second set 22 of filaments intersect, and as a result, it is possible to reduce differential pressure by increasing the cross-sectional area of the flow path, and to mitigate concentration polarization by developing a swirl flow.

Experimental Example

The feed spacer 20 according to the exemplary embodiment of the present invention was compared with the feed spacers (see FIGS. 2A, 2B, and 2C) in the related art used for the reverse osmosis filter module in terms of differential pressure ΔP[Pa], average vorticity in a flow direction, and recovery performance.

To this end, the aforementioned four products were compared in terms of differential pressure, average vorticity in a flow direction, and recovery performance in a state in which only the feed spacers are replaced and other conditions are equally maintained, and the comparison results are shown in Table 1. The experiment region is as follows.

Width×Length×Height (Thickness): 7.75 mm×15.5 mm×0.66 mm
Inlet Velocity: 0.3 m/s

TABLE 1

| | Differential Pressure (ΔP[Pa]) | Average Vorticity in Flow Direction | Recovery (%) |
|---|---|---|---|
| Comparative Example 1 | 1,238 | 1,531 | 6.75 |
| Comparative Example 2 | 1,071 | 1,340 | 6.35 |
| Comparative Example 3 | 986 | 1,380 | 6.73 |
| Example | 958 | 1,399 | 6.85 |

As described above, Comparative Example 1 uses a feed spacer having filaments with a diameter which is maintained without being changed at an intersection point, Comparative Example 2 uses a feed spacer having filaments with a diameter which is decreased at an intersection point, Comparative Example 3 uses a feed spacer having filaments with a diameter which is increased at an intersection point, and the Example uses the feed spacer 20 according to the present invention having the filaments with the diameter which is asymmetrically and partially increased at the intersection point.

Referring to Table 1, it can be seen that (a) differential pressure is 1,238 Pa and average vorticity in a flow direction is 1,531 in Comparative Example 1, (b) differential pressure is 1,071 Pa and average vorticity in a flow direction is 1,340 in Comparative Example 2, (c) differential pressure is 986 Pa and average vorticity in a flow direction is 1,380 in Comparative Example 3, and (d) differential pressure is 958 Pa and average vorticity in a flow direction is 1,399 in the Example.

In this case, considering that the structure becomes more advantageous in terms of a flow as the differential pressure becomes lower, it has been confirmed that the Example using the feed spacer 20 according to the present invention has lowest differential pressure, such that the flow is smooth, and the Example is advantageous in ensuring the flow path.

In addition, considering that the concentration polarization phenomenon is mitigated well as a degree to which the swirl flow is generated becomes greater, it has been confirmed that the Example using the feed spacer 20 according to the present invention generates the swirl flow at a significantly higher level, and a flow of salt becomes smooth in the vicinity of the reverse osmosis membrane.

Referring back to Table 1, it can be seen that (a) recovery of Comparative Example 1 is 6.75%, (b) recovery of Comparative Example 2 is 6.35%, (c) recovery of Comparative Example 3 is 6.73%, and (d) recovery of the Example is 6.85%.

Consequently, based on the aforementioned situations, it can be seen that the feed spacer 20 according to the present invention minimizes differential pressure by changing shapes of filaments (or strands) having the same maximum and minimum diameters, and improves recovery performance by increasing the occurrence of the swirl flow.

The invention claimed is:

1. A reverse osmosis filter module, comprising:
   a tube which includes an opening that accommodates a permeable liquid in a longitudinal direction;
   one or more reverse osmosis membranes which extends outward from the tube and are wound around the tube; and
   a feed spacer which is in contact with the one or more reverse osmosis membranes and wound around the tube,
   wherein:
   the feed spacer is configured such that a first set of parallel filaments and a second set of parallel filaments intersect, and at the points where the filaments intersect, one or more of the first set of filaments, or one or more of the second set of filaments, have an asymmetric diameter W2 at the intersect, the asymmetric diameter formed by an outer portion of the filament at the intersect protruding outward to form a protruding portion while a portion of the filament that is opposite to the protruding portion is maintained as it is, and in regions where the filaments do not intercept, the filaments have a symmetric diameter W1; and
   a ratio of a thickness of the asymmetric diameter W2 in the intersection to a thickness of the symmetric diameter W1 of the filament is 1.2 or more.

2. The reverse osmosis filter module of claim 1, wherein a ratio of the intersection length L2 to a lattice length L1 of the feed spacer is 0.2 to 0.4.

3. The reverse osmosis filter module of claim 1, wherein a ratio of a thickness of the asymmetric diameter W2 in the intersection to a thickness of a symmetric diameter W1 is in a range from 1.2 to 1.4.

\* \* \* \* \*